Dec. 2, 1947.　　　M. DICHTER　　　2,431,794
PHASE INDICATOR
Filed March 22, 1945
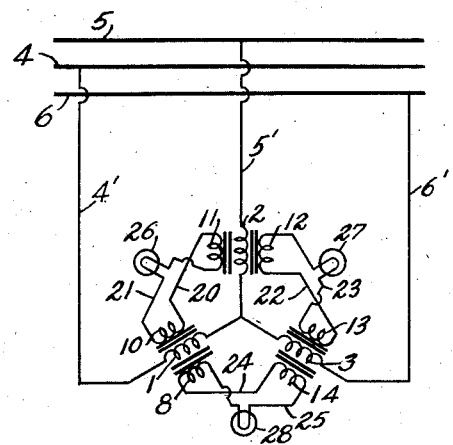
MORRIS DICHTER
INVENTOR.
BY John P. Wilonow
ATTORNEY Patented Dec. 2, 1947

2,431,794

UNITED STATES PATENT OFFICE 2,431,794

PHASE INDICATOR

Morris Dichter, Brooklyn, N. Y., assignor to Film Crafts Engineering Co., New York, N. Y., a partnership Application March 22, 1945, Serial No. 584,207

4 Claims. (Cl. 177—311)

My invention relates to phase indicators and has particular reference to apparatus for indicating a disconnected phase in a three phase circuit.

In three phase circuits, particularly in connection with the operation of induction motors, it is important that all three phases should be operating properly since a highly undesirable overloading of motors and other apparatus may result if one of the phases becomes disconnected. The motors under such conditions will continue to operate as single phase motors but with considerably increased current consumption which will be harmful to the motors and other apparatus connected thereto.

My invention has for its object to provide means to indicate by suitable signals, such as electric lamps, when one of the phases becomes disconnected.

My invention is more fully described in the accompanying specification and drawings in which:

The single figure of the drawing is a diagram illustrating the principles of my invention when applied to a three phase Y circuit.

My phase indicator in an embodiment shown in the drawing comprises a three phase transformer having primary windings 1, 2 and 3, connected at their inner ends together into a Y, the outer ends being connected to supply lines 4, 5 and 6 respectively of a three phase system by leads 4', 5', 6'. Each primary has two secondaries, 8, 10 for the primary 1, 11, 12 for the primary 2, and 13, 14 for the primary 3. The adjacent secondaries are connected together by leads 20, 21, 22, 23 and 24, 25 respectively, with electric lamps 26, 27, 28, in the leads 21, 23 and 25. The adjacent secondaries are so connected that they are 180° out of phase and therefore buck each other when a single phase current passes through the adjacent primaries, the corresponding lamp being then extinguished. Ordinarily the currents through connected secondaries are 120° out of phase and deliver enough energy to light pilot light connected across any two connected secondaries, which are energized by different primaries. Under normal conditions, when the system operates as a three phase circuit, all three lamps are burning continuously. If one of the phases, however, is disconnected, then the other two phases will operate as a single phase circuit. A three phase motor connected in this circuit will continue to rotate but as a single phase motor, with the result that it will draw an excessive current and is liable to become overheated and damaged.

With my indicator connected in such a three phase system, any fault with one of the phases will be immediately detected, because the lamp connected in the remaining two phases will go out, since, as was previously mentioned, the two adjacent secondaries are connected in opposition to each other and their voltages will cancel each other under conditions of single phase operation. Assuming, for instance, that the phase line 5 is dead and the transformer primary 2 is deenergized. The primaries 1 and 3 being energized, the secondaries 10 and 13 will supply current to the lamps 26 and 27 through the deenergized secondaries 11 and 12 respectively. These lamps therefore will continue to burn normally. The remaining phases 4 and 6, however, will form a single phase circuit through the primaries 1 and 3, energizing simultaneously both coils 8 and 14. Since these coils are connected in opposition to each other, their voltages will cancel each other, and the lamp 28 will go out, indicating that the normal operation must be restored.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A phase indicator for a three phase circuit comprising a three phase transformer having its primary windings connected with respective phases of a supply line; a pair of secondaries for each primary, the first secondary of the first primary being connected in a closed circuit with the first secondary of the second primary, the second secondary of the first primary being connected in a closed circuit with the first secondary of the third primary, the second secondary of the second primary being connected in a closed circuit with the second secondary of the third primary, the adjacent connected secondaries being connected in opposition to each other so as to cause the secondary currents to buck each other when there is 180° phase difference between the currents in the secondaries; and elements responsive to the current included in the closed secondary circuits.

2. A phase indicator for a three phase circuit comprising a three phase transformer having its primary windings connected with respective phases of a supply line; a pair of secondaries for each primary, the first secondary of the first primary being connected in a closed circuit with the first secondary of the second primary, the second secondary of the first primary being connected in a closed circuit with the first secondary of the third primary, the second secondary of the second primary being connected in a closed circuit with the second secondary of the third primary, the adjacent connected secondaries being connected in opposition to each other so as to cause the secondary currents to buck each other when there is 180° phase difference between the currents in the secondaries; and electric signal means included in the closed secondary circuits.

3. A phase indicator for a three phase circuit comprising a three phase transformer having its primary windings connected with respective phases of a supply line; a pair of secondaries for each primary, the first secondary of the first primary being connected in a closed circuit with the first secondary of the second primary, the second secondary of the first primary being connected in a closed circuit with the first secondary of the third primary, the second escondary of the second primary being connected in a closed circuit with the second secondary of the third primary, the adjacent connected secondaries being connected in opposition to each other so as to cause the secondary currents to buck each other when there is 180° phase difference between the currents in the secondaries; and electric signal lamps included in the closed secondary circuits.

4. A phase indicator for a three phase circuit comprising a three phase transformer having its primary windings Y-connected with respective phases of a supply line; a pair of secondaries for each primary, the first secondary of the first primary being connected in a closed circuit with the first secondary of the second primary, the second secondary of the first primary being connected in a closed circuit with the first secondary of the third primary, the second secondary of the second primary being connected in a closed circuit with the second secondary of the third primary, the adjacent connected secondaries being connected in opposition to each other so as to cause the secondary currents to buck each other when there is 180° phase difference between the currents in the secondaries; and elements responsive to the current included in the closed secondary circuits.

MORRIS DICHTER.

REFERENCES CITED

The following references are of record in the file of this patent:

UNITED STATES PATENTS

| Number | Name | Date |
|---|---|---|
| 818,424 | Eastman | Apr. 24, 1906 |
| 1,818,337 | Kribs | Aug. 11, 1931 |
| 2,147,781 | Ward | Feb. 21, 1939 |
| 2,053,156 | Livingston | Sept. 1, 1936 |
| 751,441 | Andrews | Feb. 9, 1904 |